Oct. 24, 1939.  J. J. GORDON ET AL  2,176,899
APPARATUS FOR EXTRACTING
Filed Nov. 7, 1934

Inventors
Jack J. Gordon & John H. Zeigler,
N. N. Perrins
Daniel J. Mayne
Attorneys Patented Oct. 24, 1939

2,176,899

UNITED STATES PATENT OFFICE 2,176,899

APPARATUS FOR EXTRACTING

Jack J. Gordon and John H. Zeigler, Kingsport, Tenn., assignors, by mesne assignments, to Eastman Kodak Company, Rochester, N. Y., a corporation of New Jersey Application November 7, 1934, Serial No. 751,843

12 Claims. (Cl. 23—270)

This invention relates to an apparatus for the extraction of chemical materials from liquids containing such materials and a process involving the use of the apparatus. More particularly, this application concerns an apparatus and process for the extraction of dilute aqueous solutions of acetic, propionic, and other aliphatic acids or mixtures thereof.

The complete or partial dehydration of aqueous aliphatic acids or mixtures thereof is a problem of great technical importance because there are great quantities of such dilute acids produced in the destructive distillation of wood, the production of acids by the action of micro-organism, and the treatment of cellulosic materials. Before these acids can be effectively employed the water must be removed.

Various processes and apparatus have been devised for the dehydration of such acids, among which may be mentioned extraction processes employing upright extraction columns of a variable diameter. These columns contain stationary baffles fixed to the column walls and a rotary shaft, having baffles fixed thereto, in the center of the column. Inlet and outlet means are also provided at suitable points in the column.

Another type of extractor of the prior art comprises a small mixing column containing a mechanical agitator. This column is located adjacent a larger column in which the extract is allowed to settle. Also, in the art of nitrating, there is apparatus which comprises a chamber having an agitator within a larger chamber. One pipe leads to the top of the agitator and another pipe from the bottom.

In general, the processes of the prior art have merely required the solvent to be contacted with the acid to be dehydrated, as by stirring the ingredients together, after which the extract layer is recovered and distilled.

Also the apparatus of the prior art have been of rather complicated structure in that they have required a number of pipes, agitators, pumps and the like. In the construction of apparatus which must contact with corrosive agents, as organic acids, the disadvantages of complicated, intricate apparatus are obvious since it is apparent, for example that the replacement of numerous corroded parts is expensive. And, on the other hand, if the apparatus is constructed of acid resisting materials, if a large number of parts are necessary this will materially increase the expense.

We have developed a new apparatus particularly suitable for the continuous extraction of dilute aliphatic acids and treatment of other chemical materials which has been found to have numerous advantages over apparatus heretofore known for these or similar purposes, together with a new process for utilizing this apparatus.

This invention has as an object to provide an apparatus for use in removing water from dilute solutions of acetic, propionic, and other aliphatic acids or mixtures thereof. A further object is to provide an apparatus which may be used not only in the treatment of relatively pure water solution of acetic, propionic, and other acids, but also in the treatment of crude aqueous solutions, such as pyroligneous liquor. A further object is to provide an apparatus which will be simple and inexpensive in construction and yet suitable for use in the treatment of corrosive organic acids as acetic, propionic, and other aliphatic acids or mixtures thereof or other materials. Another object is to provide an apparatus which readily lends itself to arrangement into series, batteries, or other type of grouping. It is also an object to provide an apparatus from which the solvent layer may be easily recovered. Another object is to provide an apparatus in which the pressure may be controlled or changed.

A still further object is to provide a process in which the treating agent is thoroughly and intimately contacted with the material undergoing treatment. Another object is to provide a process in which progressively fresher treating agent is utilized. Another object is to provide a continuous process for extraction of dilute aqueous mono-basic aliphatic acids. A still further object is the operation of the apparatus at substantially uniform speed.

Other objects will appear hereinafter.

These objects are accomplished by the following invention which comprises an extraction apparatus and a process of utilizing the same. For a more complete understanding of the invention, reference is made to the accompanying drawing forming a part of the present application. In the accompanying drawing in which like reference characters refer to like parts:

Figure 1:
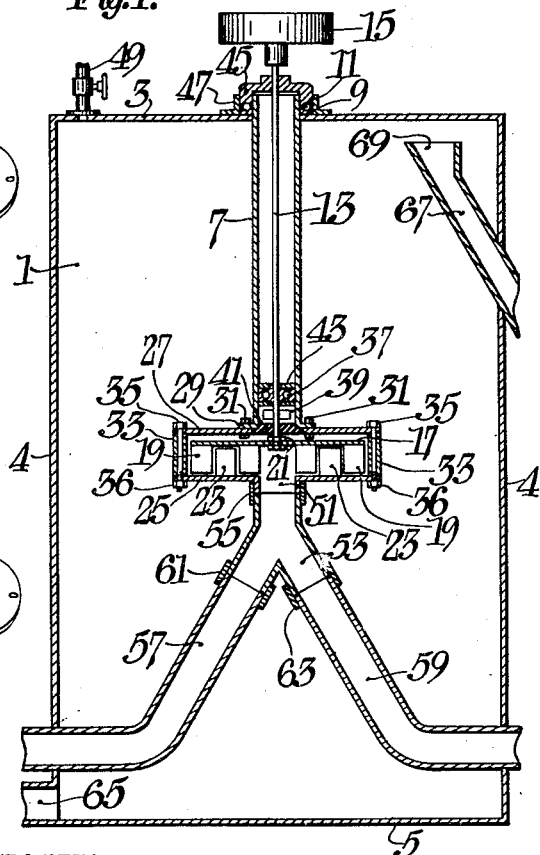
Fig. 1 is a semi-diagrammatic side elevation view of our apparatus, certain of the parts being shown in exaggerated scale and other parts being shown on section for clarity.
Figure 3:
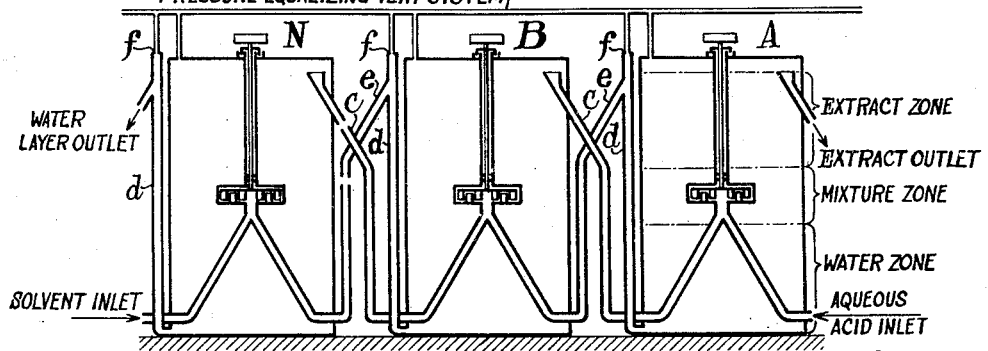
Fig. 3 is a diagrammatic side elevation of one type of a group arrangement of apparatus.

In Fig. 1 the numeral 1 represents a tank or container provided with a top 3, side walls 4 and a bottom 5. The bottom will be supported by a suitable foundation of steel, cement or the like, in a manner as indicated in Fig. 3. The tank may be of any shape, but in general it will be circular. The top 3 may be provided with a valved outlet conduit 49 for a purpose which will be apparent as the description proceeds.

Located approximately in the center of tank 1 and projecting through an opening in top 3 is a vertically extending casing 7. This casing may be in the nature of a pipe or it may be sheet material bent into a cylindrical shape, tubular shape, or other suitable form. Near the upper portion of the casing and attached thereto in any well known manner is a ring or collar 9 which is for the primary purposes of providing a means of joining casing 7 to top 3 by welding, riveting, bolting or the like. It is of course clear, that in lieu of a collar, lugs might be employed or the casing 7 could be made integral with top 3. The collar 9 may serve the additional purpose of acting as base or support for bearing means, or a bearing race or the like designated by numeral 11.

The casing 7 houses a shaft 13 which extends axially of the casing and has fixed to its upper end a pulley 15, to which power may be supplied for rotating the shaft 13.

Fixed to the lower end of shaft 13 is an agitator arm or disk 17 which carries downwardly extending blades 19. This agitator means is connected to shaft 13 in any manner which will give rigidity. That is, the agitator means might be keyed on the shaft, or held by set screws or even permanently united to the shaft as by welding. However, for ease in assembly and repair, it is desirable to attach the agitator in a way, as by a plurality of lock nuts 21, which permits the removal of the agitator without disturbing the casing 7 or many of the other parts of the apparatus. This agitator may be in the form of a single arm with blades, or a plurality of arms with blades or baffles or in the form of a circular disk having protruding blades.

For coacting with the portion of the agitator described above, is another group or row of blades designated 23, which are similar to blades 19 excepting that blades 23 are stationary and fixed to a horizontally extending baffle plate 25. They will of course be positioned so as to operate in the space between blades 19. Our preferred form of agitator will comprise two circular rows of rotating and two circular rows of stationary blades between two circular horizontally extending baffle plates. It is possible to eliminate the blades 23 and make the blades 19 longer so that they extend the full radial distance from near the center to the outer edge of the rotor 17 without a break such as the space in which the blades 23 operate. These blades 19 may extend in a radial direction or be canted at an angle to the radius or may be curved. Other changes may be made, it merely being essential that the device employed furnish sufficient pumping and agitating action.

The baffle plate 25 together with another baffle plate 27 serves to define a space within the tank 1 in which the agitator unit may function. Baffle plate 27 is of such construction that it may be attached to shaft 7 by some suitable way as by bolts 31 and the circular flange 29 which is associated with casing 7. The baffle plates 25 and 27 are spaced from one another by means of a plurality of spacer units 33. These spacer units may be in the form of a small tube or a perforated plate having a vertically extending passage therethrough whereby bolts 35 equipped with nuts 36, may be inserted for the purpose of holding the various parts together, or they may be in the form of vertical vanes cast as an integral part of either baffle plate. In addition to serving as spacers, these units also serve to break up the flow of the liquids as they are discharged from the agitator.

In order that the shaft 13 may be free to rotate, suitable bearing or bearings are provided within casing 7 as at 37, and as already indicated, with respect to the upper end of the shaft, as at 11. Adjacent the bearing 37 is a stuffing box 39 held in place by a packing nut 41. This construction prevents the liquid from rising in the casing 7. It should be noted however that the spinning of the agitator also retards to some extent any such tendency of the liquids to rise. Inwardly extending lugs 43, or other means may be provided for preventing the bearing unit and packing box from being forced too far upwardly in casing 7.

Contacting the bearing means 11 and rigidly attached to shaft 13 in any well known manner is a flanged disk 45 which rides upon the bearing means thereby carrying a greater part of the load comprising pulley, shaft, agitator, etc. Encircling the bearing means and to some extent the means 45 is a flanged collar 47 which tends to hold the parts in place. It is to be understood that any other suitable construction may be employed in place of that described.

Considering now the parts below the agitator unit, the horizontally extending circular baffle plate 25 includes a threaded neck 51, to which may be joined the Y conduit 53 by means of collar 55. Inlet conduits 57 and 59 joined to the Y by means of collars 61 and 63 respectively, are provided for conducting the solvent and material to be treated into the vicinity of the agitator. By the use of collars easy disuniting of the parts may be had thereby permitting ready access to the agitator.

Since the tank 1 serves as a settling chamber, an outlet pipe 65 in the lower part of the tank is provided for withdrawing the heavier component. An overflow conduit 67 for withdrawing the lighter component, is located in the upper part of the tank. This conduit may extend into the chamber defined by walls 3, 4 and 5 and may there terminate in a funnel shaped mouth as indicated at numeral 69. This form of mouth facilitates the flow of liquid from the tank.

Figure 2:
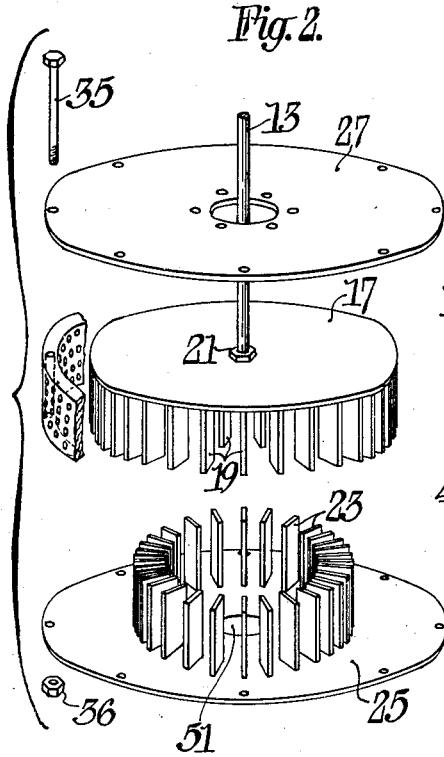
Fig. 2 is an exploded detail view on a larger scale showing one form of the agitator unit.

In Fig. 2, the parts therein shown on a larger scale are the same as those shown and described under Fig. 1 with respect to the agitator unit. It is to be understood however that this agitator unit is disclosed only for the purpose of illustration. It is possible to modify the unit in many respects such as by omitting the blades 23, employing one or more arms in place of disk 17, and casting part 33 integral with either baffle plate. In fact other types of agitator units may be employed provided they furnish the proper pumping and mixing action.

Fig. 3 shows diagrammatically an arrangement of a group of extractors, each extractor being substantially identical in construction with the unit described in detail under Fig. 1. For example, in a process of extracting aqueous acetic acid with an extracting agent comprising n-propyl acetate and n-propyl alcohol as many as 30 or 40 extractor units might be employed. Hence, while in the diagram, we have shown only views of extractors designated as A, B and N, it is to be understood that N is to represent any number of units.

Each individual unit may be connected with any other unit in any suitable manner. One way which is satisfactory, and which we prefer, is readily apparent from an inspection of Fig. 3. The overflow conduits having their mouths in the upper part of the tanks are connected by means of conduits c to one of the inlet pipes that leads to the agitator unit. The outlet pipes in the bottom of the tanks are connected by means of vertically extending conduits d having branch conduits e that connect with inlet conduits leading to agitators. The conduits d are equipped with outlet means f to which a pressure equalizing vent system may be attached. The conduit d may terminate at its upper end in an adjustable valve such that the effective height of the overflow may be adjusted at will, in order to maintain the correct ratio of water layer to solvent layer within the tank, since the interfacial level within the tank depends on the relation between the heights of the two overflows and the relative densities of the layers. This adjustment permits the use of other solvents of different density ratios. By means of such a pressure system the apparatus may be operated at a uniform pressure, an elevated pressure or a reduced pressure as may be desired. The part 49 of Fig. 1 performs a similar function.

Although it is generally preferred to use a group of extractors in some instances a single extractor may be sufficient, hence we do not wish to be limited in this respect.

Figure 4:
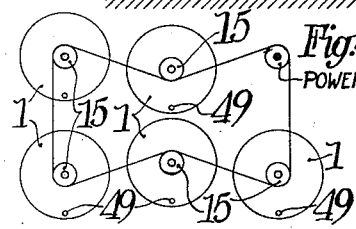
Fig. 4 is a top view of a schematic arrangement of driving means for the apparatus.

Fig. 4 shows a schematic arrangement for operating a group, or battery of our extractors. From the description of Fig. 2 it is apparent that the liquids from one extractor flow into other extractors, therefore, in order to keep the quantity of liquid in each extractor substantially equivalent to the quantity the other adjoining extractors, the input solvent feed and dilute acid feed are carefully controlled and at the same time by means of a uniform speed drive belting arrangement, as shown in Figure 4 a plurality of agitators of the group may be driven at a substantially uniform speed. That is, a belt is arranged to contact a power pulley driven by an electric motor or the like. The belt then contacts the drive pulleys on each extraction tank contacting one pulley on one side, and the next pulley on the opposite side, or the pulleys on each tank may be driven by belts contacting drive pulleys on a line shaft. In addition, the pulleys may be suitably staggered in order to tighten the belt. By this uniform drive the agitator in each tank causes a uniform and even flow of the liquids between tanks.

It will be understood that in all forms of the apparatus that the customary facilities and precautions for lubricating the bearings, packing joints and the like, will be observed.

The parts which contact the acid may be made out of acid resistant material as for example; copper or copper alloys, high silicon iron alloys, chromium-irons, chromium-nickel steels of the 18-8 type. The austenitic chromium-nickel steels which contain small additions of copper and/or molybdenum are very resistant to acetic acid.

If desired the various parts, as for example, casing 7, plates 25 and 27 and conduits 51, 57 and 59 may be further strengthened as by running rods or braces from the tank shell to these various parts.

Assuming that a plurality of extractors are to be put into operation, the following is an example of one manner of carrying out therein an extraction treatment on aqueous acetic acid, reference being made in particular to Fig. 3 of the drawing in the consideration of this process.

Power is supplied to all the pulleys and aqueous acid solution is introduced at the point designated "Aqueous acid inlet" on extractor A. At the same time a solvent having a density less than that of water is supplied at the point designated "Solvent inlet" on extractor N. Either or both of these components may be supplied by gravity flow or force feed as desired. Also the action of the agitator, because of a whirling motion imparted to the liquids which tends to throw the liquid laterally from the agitator, induces vigorous flow through the system. Consequently, after a short time, the system becomes completely charged with the liquids and streams of solvent collide with streams of the material to be extracted by virtue of the Y conduit construction beneath the agitator unit. The liquids are thereby thoroughly intermingled by this and the agitator and then they are forced away by the incoming liquids, from the agitated area into a zone as that designated "Mixture zone" on extractor A. The watery layer settles downwardly in the tank into a zone as that designated "Water zone" on extractor A and the solvent layer rises upwardly to the "Extract zone".

When continuous operation is established the following takes place: The fresh incoming dilute acetic acid in tank A collides tangentially in the vincinity of the agitator with the solvent overflow to tank A through conduit c, from tank B. This is a very important feature.

In a manner as already described the two liquids are mixed further by the agitator and then they are forced away from the agitator. Separation occurs and the watery layer flows downwardly and the solvent layer upwardly. The solvent, fully charged with acid, overflows from tank A at the "Extract outlet" to storage tanks or some other suitable place.

The watery layer containing some acid flows out through the upright conduit d by the side of tank A and is drawn into tank B by the agitator action therein. In tank B this watery stream collides with a solvent stream which overflows from the next tank. The two streams are mixed in the agitator in a manner as already described with respect to tank A. This procedure is continued until water substantially freed from acetic acid flows out of tank N through the "Watery layer outlet".

It is to be noted that the fresh solvent contacts a substantially completely extracted liquid, and that the fresh incoming acid is treated with a nearly saturated solvent. At intermediate points in the process, partially saturated solvent contacts partially extracted acid liquid.

The process is preferably operated under about atmospheric pressure conditions, however by connecting the pressure vent line with an exhaust pump or a pressure pump either sub-atmospheric or super-atmospheric pressures may be obtained in the system.

The above process has been set forth for the purpose of illustration, and while our process is particularly suitable for acetic and similar dilute acids, this is not to be interpreted as limiting the present invention thereto. For example it would be possible to employ this apparatus in the oil industry. It is also to be noted that solvents heavier than water may be employed in the apparatus. It is apparent that under those circumstances the bottom layer in the tanks would comprise solvent and the top layer water, this fact being kept in mind in respect to the materials which would then be discharged from the various outlets and overflow pipes as shown.

From the foregoing description of this invention it is apparent that various changes might be made without departing from the spirit or scope of this invention as defined by the appended claims.

We claim:

1. An extraction apparatus for treating acid liquids comprising a cylindrical tank having a top, bottom and sidewalls, a cylindrical casing extending axially of the tank attached to the top at about the center thereof and terminating at its lower end in a horizontally extending baffle plate, bearing means and packing means associated with the casing, a shaft extending through the casing and at least partially housed thereby, the shaft being provided with an agitator means on the lower end thereof and a pulley means on the upper end, a second horizontally extending baffle plate having blades thereon positioned below the agitator means, conduits means leading from the vicinity of the sidewalls into the tank and to the second baffle plate, and at least one outlet means for the tank.

2. An extraction apparatus for treating acid liquids comprising a container having a top, bottom, and sidewalls, a vertically extending casing positioned substantially centrally of the tank, bearing means and stuffing box means associated with the casing, a vertically extending shaft housed by the casing, an agitator means including two circular rows of rotating blades on a disk mounted in driven relation to the shaft at its lower end, a second disk having at least one circular row of stationary blades positioned below the first disk, conduits leading from the sidewalls substantially into the container and at least to a point adjacent the agitator means, and outlet means for the tank.

3. An extraction appartus comprising a container having sidewalls, an agitator means located within the container, baffle members associated with means having small openings enclosing the agitator means, conduit means leading from the sidewalls into the container and at least substantially to the agitator, and overflow means having a large mouth leading from the container.

4. An extraction apparatus comprising a container having a top, bottom and sidewalls, a casing extending axially of the container, a flanged disk associated with the casing arranged to form a non-rigid closure in the top, an axially extending shaft housed by the casing, pulley means attached to one end of the shaft and agitator means to the other end thereof, casing means surrounding the agitator and conduits attached to the container leading from without the extraction apparatus into the container and into close proximity with the agitator means.

5. An extraction apparatus comprising a tank having a top, bottom and sidewalls, a vertically extending casing positioned substantially centrally of the tank, a vertically extending shaft housed by the casing, an agitator means consisting of a disk carrying a plurality of curved blades mounted in driven relation to the shaft, a diffuser casing positioned to encircle the agitator, conduits leading from without the tank substantially to the agitator means, and outlet means for the tank.

6. An extraction apparatus for treating acid liquids comprising a tank having a top, bottom and sidewalls, a casing extending axially of the tank attached to the top of the tank and terminating at its lower end in a horizontally extending baffle plate member, bearing means and packing means associated with the casing, a shaft extending through the casing and provided with agitator means on one end and pulley means on the other end thereof, a second horizontally extending plate member positioned below the agitator means, conduit means leading from without the tank substantially into the tank to a point below the agitator means and in close proximity thereto, and outlet conduits for the tank.

7. An apparatus for extracting aliphatic acids with a solvent, which comprises a container having agitator means therein, baffle members on each side of the agitator and means having small openings therein at least partially enclosing the agitator, conduit means associated with the container for conducting acid and solvent, said conduit means being characterized by leading from without the container into the container to a point adjacent the agitator so that said acid and solvent may be fed thereto.

8. An extraction apparatus, comprising a container having sidewalls, agitator means located within the container, at least two conduits for carrying liquids, converging into a single conduit and said single conduit leading to the agitator for feeding said liquids thereto.

9. An extraction apparatus comprising a tank adapted to contain liquids having a top, bottom and side walls, an agitating zone within the tank provided with an agitator means, casing means at least partially enclosing the agitator means, conduit means for solvent and solute leading from outside of the tank into the tank and sufficiently close to said agitator casing means so as to feed substantially directly thereto, said conduit means being so arranged to deliver said solvent and solute into the agitating zone without mixture with other liquids in the tank, an overflow conduit leading from the tank, the overflow conduit having a large mouth.

10. An extraction apparatus comprising a container adapted to contain liquids, an agitating zone within the container provided with an agitator means, casing means at least partially enclosing said agitator means and such agitating zone at least two conduits associated with the container for carrying liquids from outside of the container to a point below the agitator casing means and in close proximity thereto, said conduits being so arranged to deliver said liquids into the agitating zone without substantial mixture with liquids already in the container, and outlet means leading from the container.

11. An apparatus for contacting liquids with one another comprising a container for the liquids, an agitating zone and settling zones within the container, a shaft extending into the container to the agitating zone, driving means attached to one end of the shaft and agitator means to the end thereof in the agitating zone, casing means surrounding the agitator means, conduits for carrying liquids leading from without the container into the container to said casing means so as to deliver said liquids into the agitating zone without substantial mixture with liquids already in the container, and conduits cooperating with the container for withdrawing liquids therefrom.

12. An extraction apparatus adapted to contain liquids comprising a substantially cylindrical tank, an agitating zone centrally within the tank provided with an agitator having more than two blades, casing means at least partially enclosing said agitator and agitating zone conduit means for carrying liquids from outside of the tank into the tank to said casing means so as to deliver said liquids into the agitating zone without mixing with other liquids in the tank prior to delivery to said zone, and an outlet means leading from the tank.

JACK J. GORDON.
JOHN H. ZEIGLER.